US011583789B2

(12) United States Patent
Mincher et al.

(10) Patent No.: US 11,583,789 B2
(45) Date of Patent: Feb. 21, 2023

(54) FILTER ASSEMBLY

(71) Applicant: Parker Hannifin Manufacturing (UK) Ltd., Hemel Hempstead (GB)

(72) Inventors: Adrian Richard Mincher, South Cave (GB); Svetlana Ferrari, Huddersfield (GB); Carl Joseph Shaw, Brighouse (GB)

(73) Assignee: Parker Hannifin Manufacturing (UK) Ltd., Hertfordshire (GB)

( * ) Notice: Subject to any disclaimer, the term of this patent is extended or adjusted under 35 U.S.C. 154(b) by 57 days.

(21) Appl. No.: 16/508,339

(22) Filed: Jul. 11, 2019

(65) Prior Publication Data
US 2019/0329159 A1 Oct. 31, 2019

Related U.S. Application Data

(63) Continuation of application No. PCT/GB2018/050181, filed on Jan. 22, 2018.

(51) Int. Cl.
*B01D 27/08* (2006.01)
*B01D 27/06* (2006.01)
(Continued)

(52) U.S. Cl.
CPC ............ *B01D 27/08* (2013.01); *B01D 27/06* (2013.01); *B01D 35/153* (2013.01);
(Continued)

(58) Field of Classification Search
CPC combination set(s) only.
See application file for complete search history.

(56) References Cited

U.S. PATENT DOCUMENTS 4,045,349 A * 8/1977 Humbert, Jr. .......... B01D 27/08
210/232
5,744,030 A 4/1998 Reid
(Continued)

FOREIGN PATENT DOCUMENTS

CN  201613087    10/2010
EP  0 887 100 A1  12/1998
(Continued)

OTHER PUBLICATIONS

Search Report for GB1701107.3 dated Jul. 21, 2017.
(Continued)

*Primary Examiner* — Benjamin M Kurtz
(74) *Attorney, Agent, or Firm* — Christopher H. Hunter

(57) ABSTRACT

A filter assembly comprises a filter element, and a mount having at least one port. Each of the filter element and mount has inter-engaging connection formations, where the filter element and mount can be detachably connected to one another. The mount defines a flow path between the port and filter element when the element is connected to the mount and includes a link element which can slide relative to the mount between retracted and deployed positions. The link element has one of a lug and an inclined ramp surface, and the filter element has the other of the lug and ramp surface. The lug and ramp surface form a cam drive where the lug engages the ramp surface as the filter element and mount are assembled, and slide along the surface when the element is rotated to draw the link element out of the mount towards its deployed position.

26 Claims, 6 Drawing Sheets

(51) Int. Cl.
    *B01D 35/153*      (2006.01)
    *B01D 35/30*      (2006.01)

(52) U.S. Cl.
    CPC .... *B01D 35/306* (2013.01); *B01D 2201/0415* (2013.01); *B01D 2201/291* (2013.01); *B01D 2201/302* (2013.01); *B01D 2201/4007* (2013.01); *B01D 2201/4061* (2013.01); *B01D 2271/022* (2013.01)

(56) References Cited

U.S. PATENT DOCUMENTS

| | | | |
|---|---|---|---|
| 6,723,239 | B2 | 4/2004 | Maxwell |
| 6,746,600 | B2 | 6/2004 | Nguyen |
| 6,911,143 | B2 | 6/2005 | Janik |
| 7,135,113 | B2 | 11/2006 | Bassett |
| 7,531,090 | B1 | 5/2009 | Stamey |
| 7,850,755 | B2 | 12/2010 | Krull |
| 8,231,793 | B2 | 7/2012 | Hacker |
| 8,425,773 | B2 | 4/2013 | Bonta |
| 9,212,576 | B2 | 12/2015 | Hirsch |
| 2001/0030148 | A1 | 10/2001 | Knight |
| 2002/0162782 | A1* | 11/2002 | Maxwell ............... B01D 27/106 210/234 |
| 2004/0232064 | A1 | 11/2004 | Wilkinson |
| 2006/0096934 | A1 | 5/2006 | Weinberger |
| 2006/0254971 | A1 | 11/2006 | Tubby |
| 2007/0000830 | A1 | 1/2007 | Snider |
| 2007/0084432 | A1 | 4/2007 | Jensen |
| 2008/0053884 | A1 | 3/2008 | Marshall |
| 2008/0053886 | A1 | 3/2008 | Marshall |
| 2009/0008317 | A1 | 1/2009 | Mules |
| 2009/0090668 | A1 | 4/2009 | Abdalla |
| 2010/0224539 | A1 | 9/2010 | Luther |
| 2013/0228504 | A1 | 9/2013 | McElroy |
| 2014/0190880 | A1 | 7/2014 | Krull |
| 2014/0366494 | A1 | 12/2014 | Ardes |
| 2015/0090653 | A1 | 4/2015 | Kotale |

FOREIGN PATENT DOCUMENTS

| | | |
|---|---|---|
| KR | 100 944 226 B1 | 2/2010 |
| KR | 2012 0038297 A | 4/2012 |
| WO | 0180967 A1 | 11/2001 |
| WO | 2015156760 A1 | 10/2015 |

OTHER PUBLICATIONS

Search Report for GB1701107.3 dated Oct. 17, 2017.
Partial International Search Report for PCT/GB2018/050180 dated Apr. 26, 2018.
International Search Report and Written Opinion for PCT/GB2018/050180 dated Aug. 27, 2018.
Search Report for GB1701108.1 dated Jul. 25, 2017.
Search Report for GB1701108.1 dated Oct. 19, 2017.
International Search Report and Written Opinion for PCT/GB2018/050181 dated May 7, 2018.
Written Opinion for PCT/GB2018/050181 dated Jan. 16, 2019.

* cited by examiner

FILTER ASSEMBLY

This application is a continuation application pursuant to 35 U.S.C. § 120 of PCT/GB2018/050181 filed on Jan. 22, 2018 which claims the benefit of G. B Application No. 1701108.1 filed Jan. 23, 2017, the contents of both of which are incorporated herein by reference.

BACKGROUND

This invention relates to a filter assembly which includes a filter element. The filter can be used to remove contaminants from a fluid, especially particulate contaminants. The fluid can be a liquid or a gas.

Filters which are used to remove contaminants from a fluid frequently include a filter element which is attached to a mount. The filter element includes a filter media. The fluid flows through the filter media. The mount includes an inlet through which the fluid is supplied to the filter element, and an outlet through which the fluid can be discharged from the filter after it has been filtered by flowing through the filter media. The material of the filter media is selected according to the nature of the fluid, the nature of the contaminants, and the operating conditions of the filter.

It is common for a filter element to be capable of being removed from the mount for replacement, in particular when its capacity to absorb contaminants is limited. It is important for efficient operation of the filter that seals are created reliably between corresponding surfaces of the filter element and the mount to ensure that the fluid which is to be filtered is not able to flow between the inlet and outlet in the mount without having to flow through the filter media.

SUMMARY

A filter assembly is provided in which a mount includes a link element which can be made to move axially when a filter element is rotated relative to the mount, causing the link element to slide axially to a deployed position.

A filter assembly is therefore also provided which comprises a filter element for filtering a fluid, and a mount having at least one port, each of the filter element and the mount having interengaging connection formations by which the filter element and the mount can be detachably connected to one another, and the mount defining a flow path for fluid to flow between the port and the filter element when the filter element is connected to the mount,
  a. in which the mount includes a link element which can slide relative to the mount between a retracted position and a deployed position, the link element having one of a lug and an inclined ramp surface which is arranged around an axis, and the filter element having the other of the lug and the inclined ramp surface,
  b. and in which the lug and the ramp surface form a cam drive in which the lug is capable of engaging the inclined ramp surface as the filter element and the mount are brought together for assembly, and of sliding along the inclined ramp surface when the filter element is rotated relative to the mount to cause the link element to be drawn out of the mount towards its deployed position.

The filter assembly has the advantage that deployment of the link element requires that a filter element is connected to the mount with the filter element and the link element having appropriately matched lugs and ramp surfaces which can provide a cam drive arrangement, in which the ramp surface functions as a cam surface and the lug functions as a cam follower. Deployment of the link element is not possible when the lugs and ramp surfaces on the filter element and the link element are not appropriately matched. It means that the link element cannot be deployed if an operator attempts to use a filter element with a mount which does not match the mount. This can help to reduce the likelihood of use of an incorrect filter element which might for example have inappropriate filtration characteristics or might be sized incorrectly.

Movement of the link element can prepare the connection between the mount and a filter element for use. Examples of ways in which the link element can prepare the connection for use include:
  1. Movement of the link element can cause a part with connection formations to be deployed, which can engage corresponding formations on the filter element to provide a secure mechanical connection between the mount and the filter element.
  2. Movement of the link element can cause a sealing component to move relative to other parts of the mount between a first position in which a seal is formed to prevent loss of fluid flowing between the mount and a filter element and a second position in which the connection is not sealed.
  3. Movement of the link element can cause a valve member to move between an open position in which flow of fluid between the mount and the filter element is possible and a closed position in which the flow of fluid is blocked.

The movement of the link element can be used to achieve one or more of these and other objectives.

The axis may be an axis of assembly and may be a longitudinal axis. The axis may be an assembly axis.

The filter element and the mount may be arranged so that they are brought together by moving the filter element in a first direction relative to the mount. The lug and the ramp surface may be arranged so that the link element moves from the retracted position to the deployed position in a second direction which is opposite to the first direction. The first and second directions may be first and second axial directions. The axial directions may be taken relative to an axis of the filter assembly, which may be an assembly axis along/on which the filter element and the mount are aligned for connection together. The link element may move axially away from the mount to the deployed position.

At least part of the ramp surface may extend approximately helically around the one of the filter element and the link element which has the ramp surface.

The link element may be moved by rotating the filter element relative to the mount while the lug is engaged with the ramp surface, a shape of the ramp surface causing the lug to be drawn out of the mount.

The lug can be provided on the mount and the ramp surface can be provided on the filter element. It is also envisaged that the lug can be provided on the filter element and the ramp surface can be provided on the mount.

It will often be preferred that more than one lug is provided for engaging the ramp surface. When two or more lugs are provided, the lugs can be spaced apart around the assembly axis. The lugs can be spaced apart equally around the assembly axis. This can facilitate assembly of the filter element and the mount. The spacing of lugs around the assembly axis can be unequal so that assembly of the element and the mount requires a specific initial rotational orientation of the element relative to the mount. This can help to ensure that the filter element that is assembled with a mount is the appropriate element.

The ramp surface in filter assemblies as presented in this document will generally be a surface which faces in the same axial direction as the direction in which the filter element is moved towards the mount when the two are moved together during assembly. The ramp surface can be provided by a flange (including a plurality of partial flanges) extending around the axis. When the ramp surface is provided on a flange, an opening can be formed in the flange to allow the lug to be moved through the flange so that it can act on the ramp surface. Such an opening in the flange can define a plurality of partial flanges. When there are two or more lugs, there will normally be a corresponding number of openings in the flange. The arrangement (for example sizes and relative locations) of the openings should correspond to the sizes and locations of the lugs. Matching the arrangement of the or each lug and the corresponding openings in a flange can be relied on to ensure that the filter element which is assembled with a particular mount is the appropriate filter element.

When two or more lugs are provided, they can be provided at different points along the assembly axis so that they can cooperate with a ramp surface (which might be a continuous ramp surface or a ramp surface which has gaps along its length). It is also envisaged that lugs might be provided at the same point along the assembly axis and that separate ramp surfaces are provided to engage respective ones of the lugs.

The lugs and ramp surfaces should be matched so that the lugs can engage the ramp surfaces as the filter element and the mount are brought together for assembly. This can require matching of features such as the sizes and locations of lugs and ramp surfaces. It might also require that appropriately sized and spaced openings are provided in a flange for the lugs to pass through in order to access the ramp surfaces. For example, the or each ramp surface can be provided on a flange. When the ramp surface is provided on a flange, an opening can be formed in the flange to allow the lug to be moved through the flange so that it can act on the ramp surface. When there are two or more lugs, there will normally be a corresponding number of openings in the flange. The arrangement (for example sizes and relative locations) of the openings should correspond to the arrangement of the lugs.

Optionally, the link element is tubular and provides a flow path for fluid to flow between the mount and the filter element.

Optionally, the connection formations on the mount which engage connection formations on the filter element are provided on the link element. It can often be preferred that the connection formations on the mount and the filter element are unable to engage one another when the link element is in its retracted position. The connection formations on the link element can then be arranged only to engage the corresponding connection formations on the filter element once the link element has been at least partially deployed.

Optionally, the connection formations by which the mount and the filter element can be connected to one another can comprise threads. A thread can be provided on the link element. For example, the link element can be received in an opening in the filter element. The link element might then have a male thread which can engage a female thread provided in the opening in the filter element. The invention makes it possible for the threads on the mount to be incapable of engaging the threads on the filter element unless the link element has been at least partially deployed.

Optionally, the mount includes an end stop which limits movement of the link element relative to the body of the mount and defines its deployed position. Limiting the extent of the movement of the link element allows the link element then effectively to provide a fixed point to which the filter element can be attached. The end stop can be provided by a flange on the link element which is sized so that it is not able to slide out of and therefore be separated from the mount.

Optionally, the link element includes a tubular member and the lug or the inclined ramp surface is provided on a wall of the tubular member. Optionally, the feature (lug or ramp) can be provided on an external wall of the tubular member, with the mating feature (ramp or lug) on the filter element provided on the wall of a bore in the filter element. In some constructions, the feature might be provided on an internal wall of the tubular member, with the mating feature on the filter element provided on an external wall of a cylindrical portion of the filter element.

Optionally, the link element comprises an initiator part on which the lug or the inclined ramp surface is provided, and a connector part on which the connection formations are provided, and in which the initiator and connector are arranged telescopically so that one of them can slide within the other. Optionally, the connector part of the link element is a tubular part which can provide a sealed flow path for fluid to flow between the mount and the filter element. The initiator part of the link element can also be a tubular part.

Optionally, at least one of the link element and the filter element carries an O-ring for forming a seal between the link element and the filter element. When the link element has first and second telescopic parts, the O-ring can be provided on the second part, together with connection formations. The initiator part of the link element can then be seen as a driver to cause the connector part of the link element to be deployed so that a connection can be made between the filter element and the mount through the connection formations on the filter element and the connector part of the link element.

The initiator part of the link element can include a plurality of fingers which extend along the axis on which the element and the mount are connected to one another and are separated from one another by axially extending slits. Each of the fingers can have a latch portion towards its free end which can be received in a recess when parts of the link element are fully assembled together. The initiator and connector parts of the link element can be separated from one another by deforming the fingers so that the latch portions are released from their respective recesses. The recesses can be provided by one or more flanges on the connector part of the link element, for example by an axially facing annular flange which extends around the connector part of the link element.

Optionally, the filter assembly includes a compressible seal located between the connector part of the link element and a surface of the mount with which the connector part is in contact.

Optionally, the mount can include a deformable sealing member which provides a seal between the base and a connector part of the link element. The deformable sealing member on the mount can be located in a groove. It can be provided on the mount or on the link element.

Translation of the part of the link element can bring connection formations on a connector part into proximity with the connection formations on the filter element so that they can engage one another. When the connection formations are threads, continued rotation of the filter element relative to the mount can cause the filter element to become connected to the mount through the engagement of the threads.

Translation of the connector part of the link element can bring sealing surfaces on the link element and the filter element into sealing engagement with one another.

Translation of the connector part or of the initiator part or of both parts of the link element can cause a valve to open to allow fluid to flow along the flow path between the port in the mount and the filter element.

Optionally, the filter element and the mount have cooperating sealing surfaces. The sealing surfaces can face along the axis of the assembly. For example, the sealing surface of the filter element can be provided by an outer rim of the filter element. The sealing surface of the mount can be provided by a face of the mount which the outer rim of the filter element contacts when the element and the mount are assembled for use.

Optionally, at least one of the cooperating sealing surfaces is provided by a deformable sealing member. The other of the sealing surfaces can then optionally be provided by a material which is more rigid than that of the deformable sealing member so that the deformable sealing member is compressed when the filter element and the link element are assembled.

The filter element and the link element can have seal features which can minimise loss of fluid at the connection between the two elements. A seal can be provided by matching threads on the two elements. Features for sealing the connection between the two elements can include a deformable sealing member.

Optionally, the mount and the link element have cooperating sealing surfaces. Optionally, the sealing surfaces on the mount and the link element are brought into sealing engagement with one another as a result of the link element being deployed. Optionally, at least one of the cooperating sealing surfaces on the mount and the link element is provided by a deformable sealing member. The other of the sealing surfaces can then optionally be provided by a material which is more rigid than that of the deformable sealing member so that the deformable sealing member is compressed when the sealing surfaces on the mount and the link element are brought into sealing engagement with one another.

Optionally, the link element comprises an initiator part on which the lug or the inclined ramp surface is provided and a connector part, the initiator and connector parts being arranged telescopically so that one of them can slide within the other. The sealing surface on the link element which cooperates with the sealing surface on the filter element can be provided in the connector part of the link element.

Translation of the part of the link element can bring connection formations on a connector part into proximity with the connection formations on the filter element so that they can engage one another. When the connection formations are threads, continued rotation of the filter element relative to the mount can cause the filter element to become connected to the mount through the engagement of the threads.

Translation of the connector part of the link element can bring sealing surfaces on the link element and the filter element into sealing engagement with one another.

Translation of the connector part or of the initiator part or of both parts of the link element can cause a valve to open to allow fluid to flow along the flow path between the port in the mount and the filter element.

Optionally, the mount includes a valve having an open state in which fluid can flow along the flow path and a closed state in which the valve at least partially prevents flow of fluid along the flow path.

Optionally, the link element forms part of the valve. The link element can define part of the flow path when it is in its deployed position and can form an at least partial obstruction to flow of fluid along the flow path when it is in its retracted position.

The valve may include a valve member which slides in a bore in the mount through which fluid can flow towards the filter element for filtration or away from the filter element after being filtered. The valve member may be acted on by the link element to move the valve between the open and closed states of the valve.

Optionally, the valve member can slide between a retracted position in which the bore in the mount in which the valve member can slide is occluded and a deployed position in which the said bore is at least partially open for flow of fluid.

Optionally, the bore in the mount has an opening in its side wall which is at least partially open to flow of fluid when the valve member is in its deployed position, and in which movement of the valve member to its retracted position causes the opening to be closed at least partially by the valve member.

Optionally, the valve member is tubular and has an opening in its side wall, and in which the openings in the side wall of the valve member and the side wall of the bore in the mount overlap one another at least partially when the valve member is in its deployed position.

Filter assemblies as presented in this document can include features of one, two or all three of (a) the connection formations, (b) the sealing surfaces, and (c) the valve, which are discussed above. Features which are discussed in this document in relation to a filter assembly having one combination of these three features can be used in filter assemblies having other combinations of the three features.

Optionally, the mount includes a spring which acts on the link element to bias it towards its retracted position. The spring can act between the link element and a part of the mount which the link element moves relative to.

Optionally, when the link element has initiator and connector parts, the mount can include a spring which acts on the connector part to bias it towards its retracted position.

When the link element has initiator and connector parts which are fixed against movement relative to one another, the spring can act between either of the parts and a part of the mount which the parts move relative to.

The housing can include a shaft which is fixed to the housing base, on which the link element can slide. The shaft can help to guide the link element as it slides. When the link element has first and second parts, the first part of the link element can slide on the shaft. A shaft can provide an end stop which limits the extent of the sliding movement of the link element.

A filter element is also provided, which comprises a filtration media and an end fitting at one end of the filter element through which a sealing connection is made between the filter element and a mount, a. in which the filtration media defines a hollow chamber, and the end fitting has a tubular bore extending from it in a direction towards the hollow chamber which defines an axis and is open for fluid flow at the end fitting so that fluid can flow between the mount and the hollow chamber, b. and in which a component of a cam drive, which comprises a lug and an inclined ramp surface which is arranged around the axis of the bore, is formed in the wall of the tubular bore so that it can engage the other component of the cam drive which is provided on the mount, c. and in which a female thread is formed in the wall of the bore between the component of the cam drive and the end of the bore which is closest to the end of the filter element.

The wall of the bore in which the female thread is formed may have an internal circumference. The female thread may extend substantially continuously around the entire internal circumference. The thread may therefore extend in substantially unbroken fashion around the internal circumference. Whilst the thread may extend around the entire internal circumference of the wall of the bore, the thread may only extend along a portion of an axial length of the wall of the bore.

The female thread may describe a minimum internal diameter, which may be measured from crest to crest of the thread. A part of the wall of the tubular bore in which the component of the cam drive is formed may describe a maximum internal diameter, which may be less than the minimum internal diameter described by the female thread.

Optionally, the component of the cam drive which is formed in the wall of the tubular bore is the inclined ramp surface. The minimum internal diameter described by the female thread may be greater than a maximum external diameter described by the lug of the cam drive provided on the mount. The maximum external diameter described by the lug may be the diameter of a circle which intersects with a maximum radially outer extent of the lug.

Optionally, the filter element includes a sealing member which protrudes from the surface of the end fitting which defines the tubular bore in the end fitting and extends continuously around the bore, the material of the sealing member being more deformable than the material which defines the tubular bore. For example, the sealing member might be made from a deformable material such as a rubber. The bore in the end fitting might be made from a more rigid material which might be a polymer or a metal. The sealing member might be located in a groove which helps to locate the sealing member against movement along the axis of the filter element. The sealing member can be used to form a seal between the filter element and a part of the mount which extends into the tubular bore when the filter element is assembled with the mount.

The filter element can be used in a filter assembly which comprises a mount having at least one port, each of the filter element and the mount having inter-engaging connection formations by which the filter element and the mount can be detachably connected to one another, and the mount defining a flow path for fluid to flow between the port and the filter element when the filter element is connected to the mount, a. in which the mount includes a link element which can slide relative to the mount between a retracted position and a deployed position, the link element having one of a lug and an inclined ramp surface which is arranged around the axis, and the filter element having the other of the lug and the inclined ramp surface, b. and in which the lug and the ramp surface form a cam drive in which the lug is capable of engaging the inclined ramp surface as the filter element and the housing are brought together for assembly, and of sliding along the inclined ramp surface when the filter element is rotated relative to the mount to cause the link element to be drawn out of the mount towards its deployed position.

The filter assembly can have any of the features of the assemblies discussed above.

The component of the cam drive which is formed in the wall of a bore in the filter element is one of (a) an inclined ramp surface which is arranged around the axis of the bore and (b) a lug. The other of the inclined ramp surface and the lug can be provided on a link element of a mount so that, when the lug and the inclined ramp surface engage one another, and the filter element is rotated relative to the mount, the link element is made to move relative to the mount from a retracted position towards a deployed position.

It can be preferred that the component of the cam drive which is formed in the wall of the bore in the filter element is an inclined ramp surface. This can be engaged by one or more outwardly extending lugs provided on the external surface of a tubular link element on a mount.

The filter element can provide a sealing surface which can cooperate with a corresponding sealing surface on the link element of a mount. The sealing surface can be provided in the tubular bore which extends from the end fitting of the filter element. The sealing surface can be provided at or close to the end fitting. For example, a seal can be formed by cooperating threads on the end fitting of the filter element and on the link element.

Assembly of the filter element with a mount involves positioning the end fitting so that the end of the link element extends into the tubular bore in the filter element. The lug and inclined ramp surface components of the cam drive are engaged with one another so that the lug is in contact with the inclined ramp surface. The filter element is rotated relative to the mount. This causes the or each lug to translate along the inclined ramp surface so that the link element is drawn out of the mount. A male thread on the link element is drawn into engagement with the female thread which is formed in the wall of the bore between the component of the cam drive and the end cap so that continued rotation of the filter element results in a connection being formed between the filter element and the mount through the engaged male and female threads. A seal is formed between the link element and the filter element as the link element is drawn out of the mount, especially as a result of the engagement of the threads.

The filter element can include a cylindrical wall of a filter media which is arranged so that the fluid which is to be filtered flows through the wall between a first port which communicates with the valve in the housing and the central axial cavity within the filter element and a second port which communicates with the circumferential space around the outside of the element. The second port will frequently be at or adjacent to an end of the filter element. The second port can be at or adjacent to the same end of the filter element as the first port. The second port can be at or adjacent to the opposite end of the filter element from the first port.

The filter assembly can be designed to operate with the fluid to be filtered flowing through the wall of the filter element from the inside to the outside. The filter assembly can be designed to operate with the fluid to be filtered flowing through the wall of the filter element from the outside to the inside.

The material for the media in the filter element will be selected according to the fluid which is to be filtered and the nature of contaminants that are to be separated from the fluid. The fluid might be a gas or a liquid. The contaminants might be solid or liquid (especially when the fluid is a gas). Features of filter elements which can be incorporated in the element used in the assembly of the invention are known from existing filter elements for various applications.

The material of the filter media is selected according to the intended application for the filter. The filter might be used to filter a pressurised gas, such as for example compressed air. The filter might remove particulate contaminants from the gas including aerosol droplets. The filter might be used to filter a liquid. The filter can remove solid particles from the liquid. The filter can be used to separate an immiscible liquid contaminant from a process liquid, for example to remove water from a hydrocarbon fuel. Examples of materials for the filter media include open cell foam materials, paper or other cellulosic materials, materials made from non-woven fibres, such as for example melt blown fibres, which might be made from polymers such as polyolefins, polyesters and polyamides.

The filter element will generally include an end fitting. Frequently a filter element will have an end fitting at each of two opposite ends. The end fittings can be configured to engage with fittings in or on a filter housing in which the element is to be used. For example, an end fitting can be configured to engage with valve features in the mount for the element. An end fitting can be configured to engage with features at an end of a filter housing opposite to its base. An end fitting can be configured to engage with features of a filter housing at an end at which the filter housing can be opened to enable the element to be inserted into the housing. An end fitting can have an opening extending through it which communicates with a hollow chamber within the element. This can be particularly appropriate for an end fitting which is intended to engage with valve features in the base of a filter housing, allowing fluid within the filter element to flow between the filter element and the valve in the filter housing. An end fitting which is configured to engage with features at an end of a filter housing opposite to its base can be a cap which closes the filter element to flow of fluid into or from a cavity within the filter element.

The end fitting can be an end cap of the filter element. The end fitting can include one or more axially facing grooves in which an axially facing edge of the filter media is received. The filter element might include a support layer for the filter media, for example in the form of a perforated plate. A perforated plate can help to separate contaminants from a fluid stream. The support layer, and possibly other layer components, can also be received in the axially facing groove in the end fitting. An end fitting can include more than one axially facing groove. Component layers (filter media (including coalescer), supports etc.) of a filter element can be distributed between respective grooves. The edges of component layers can be fastened within the grooves provided in the end fittings by means of a material other than the materials of the component layers of the filter element and of the end fitting, for example by means of an adhesive material. The edges of component layers can be fastened within the grooves provided in the end fittings without use of a material other than the materials of the component layers and of the end fitting, for example by a welding technique in which the materials of one or both of the component layer(s) and the end fitting (especially the material of the end fitting) is made to melt. This might be achieved by exposure to infrared radiation. Appropriate fastening techniques are known for use in the construction of filter elements.

An end fitting can be formed from a polymeric material by moulding. Materials which can be used in this way in the manufacture of filter element end fittings are known. The selection of a suitable material will depend on the application for the filter element including for example the materials to which it will be exposed when in use and the conditions (for example temperature and differential pressure across the element). Filter media layer components can be fastened within an axially facing groove in an end fitting using an adhesive material, or by use of a welding technique.

The mount can form part of a housing for a filter element. The housing can include a housing body which, when the housing body is engaged with the mount, encloses the filter element. The housing body can be a hollow container which the filter element can be fitted into. The housing body can define an annular space between the media material of the filter element and the inside wall of the housing body for a process fluid. Fluid in the annular space will be filtered fluid when the filter operates in an inside-to-outside mode. Fluid in the annular space will be intended for filtration when the filter operates in an outside-to-inside mode. A filter assembly can include a housing body in the form of an open-ended container, and a seal component which can be fitted between the edge which defines the open end of the canister and the surface of the mount so that a seal is formed between the canister and the surface of the mount when the two are urged together.

A housing body can be provided with a filter element so that the housing body and the filter element are separated together from the mount. The housing body might be supplied with a filter element on the basis that they are not intended to be separated from one another, so that the housing body is replaced in a filter assembly together with the filter element. For example, the housing body might be provided in the form of a hollow container which is open at a first end and closed at a second end opposite to the first end. The filter element can be located in the container through the open first end. A closure plate can be fastened to the wall of the container at the first end. A filter element within the housing body will frequently be formed with a hollow chamber defined by a wall of a filtration media, with an end fitting having a tubular bore extending into the hollow chamber. A closure plate can then have an opening formed in it. A sealing member can be provided to form a seal between the closure plate around the said opening and the end fitting.

The housing body can be provided as wall and base parts. The wall part might be capable of being separated from the base part. The base part can include a drain for liquid contaminants which have been separated from the process fluid using the filter element.

A housing body can include a deformable sealing member at the edge which contacts the mount when the housing body fastened in place on the mount.

The mount can define a flow path for fluid to flow between the mound and the filter element through the port in the mount, when the filter element is connected to the mount. The mount will usually include two ports, with one port provided for fluid to flow into the filter element to pass through the filter media and the other port provided for fluid to flow out of the filter element after it has passed through the filter media. Both ports can be provided in the mount. In this case, the mount will define flow paths for fluid to flow from a first port to the filter element for filtration, and to the second port from the filter element after it has been filtered. One of the flow paths will generally extend between a port and an annular space around the filter media, and the other of the flow paths will then extend between a port and the hollow space within the filter element which is defined by the filter media. Designs of filter housings which incorporate these features are well known.

The filter element, and a filter assembly which incorporates the filter element, can be designed to operate with the fluid to be filtered flowing through the wall of the filter element from the inside to the outside. The filter assembly can be designed to operate with the fluid flowing through the wall of the filter element from the outside to the inside.

Filter assemblies as presented in this document can be arranged with the filter element connected to the mount at an upper end of the filter element and the media of the filter element located below the mount.

Filter assemblies as presented in this document can be arranged with the filter element connected to the mount at a lower end of the filter element and the media of the filter element located above the mount.

Suitable materials for O-rings used in the filter assembly are known from existing filters. They can include certain rubbers, including for example acrylonitrile butadiene rubbers (NBRs), ethylene propylene diene monomer (EPDM) rubbers, silicone rubbers, fluorosilicone rubbers, and thermoplastic elastomers.

BRIEF DESCRIPTION OF THE DRAWINGS

Filter elements, filter assemblies, and components thereof are is described below by way of example with reference to the accompanying drawings, in which.

DETAILED DESCRIPTION

Figure 1:
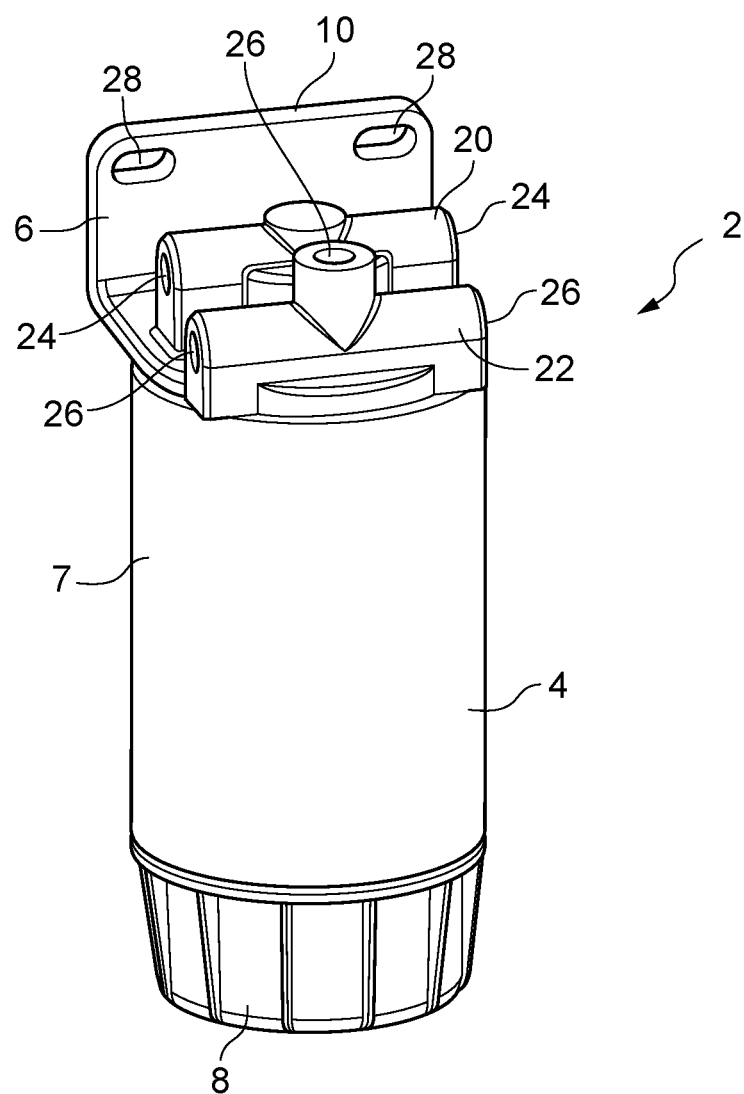
FIG. 1 is an isometric view of a filter assembly.

Referring to the drawings, FIG. 1 shows a filter assembly 2 which includes a housing body 4 and a mount 6. The housing body 4 has a cylindrical wall 7 which defines a hollow space within the body. The housing body includes a base 8. The base includes a drain for liquid contaminants which are separated from the process fluid by means of a filter element within the housing body.

The mount includes first and second conduits 20, 22 for the process fluid. The first conduit 20 communicates with a hollow space within a filter element provided within the housing body. The second conduit 22 communicates with an annular space between the cylindrical wall of the filter element that is provided by the filter media, and the internal surface of the cylindrical wall 7 of the housing body 4. A connection to each of the fluid conduits can be made at any of a number of ports. In the construction shown in FIG. 1, the first fluid conduit has two possible ports 24 and the second fluid conduit has three possible ports 26. Ports which are not used can be blocked using an appropriate blanking piece.

The mount has a fixation flange 10, with holes 28 formed in it in which fixation screws can be inserted to fasten the mount in place for use.

Figure 2:
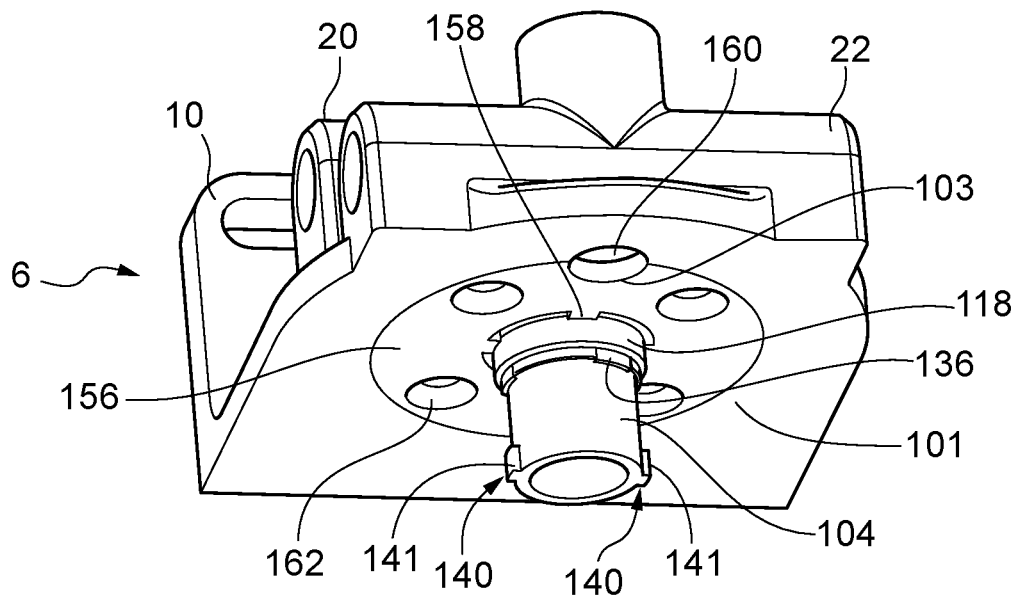
FIG. 2 an isometric view from below of the mount of the filter assembly shown in FIG. 1 on which a filter element can be mounted.
Figure 4:
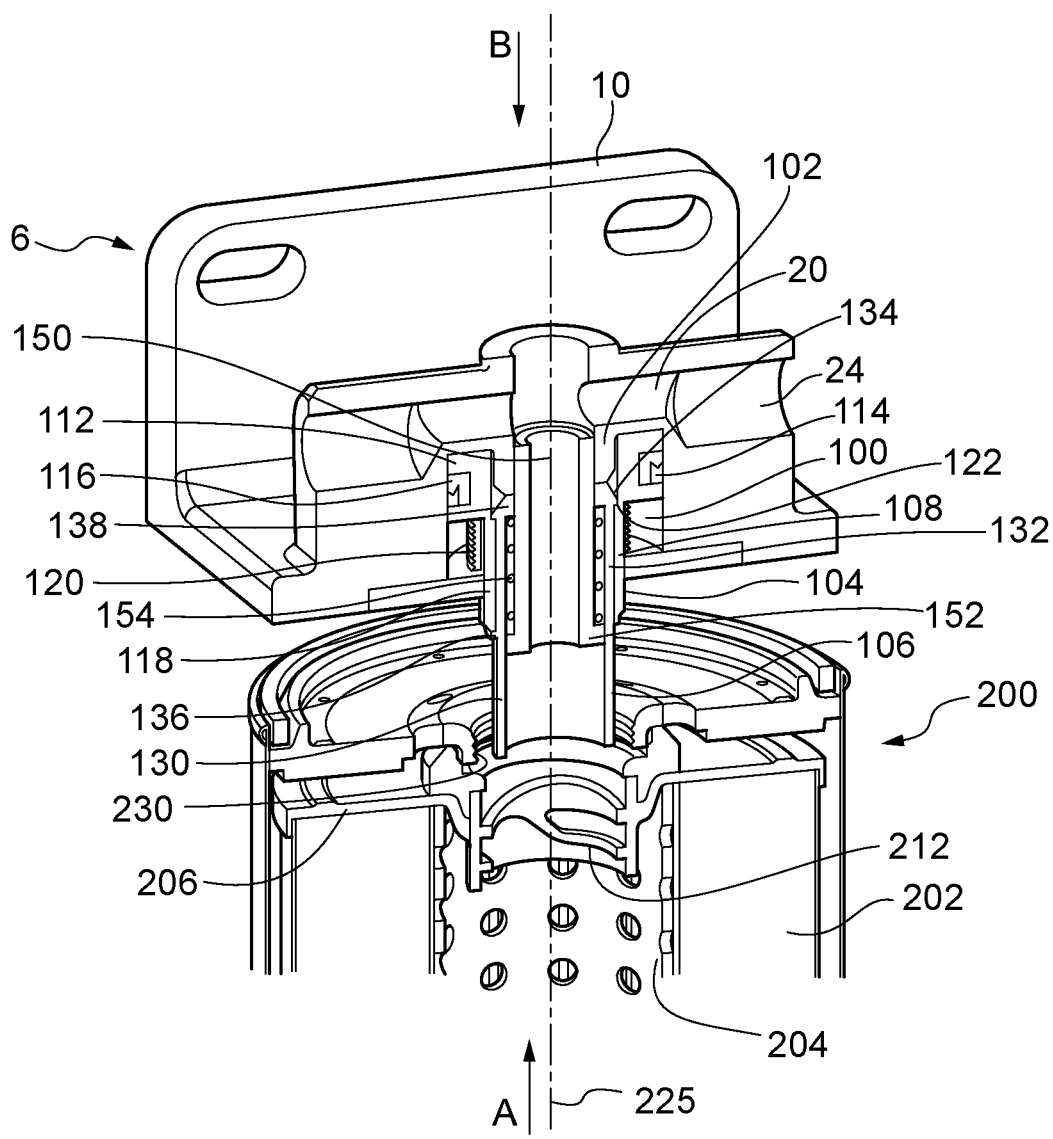
FIGS. 4 to 6 are isometric sectional views of the mount shown in FIG. 2 and the filter element shown in FIG. 3, at initial, intermediate and fully assembled stages.

Features of the mount can be understood with reference to FIGS. 2 and 4. FIG. 4 is a sectional view, with the section plane coinciding with the axis of the first fluid conduit 20. The mount has a chamber 100 formed within it and a planar bottom face 101. The chamber is circular. A central port 102 extends between the chamber and the first fluid conduit. A peripheral port 103 extends between the planar bottom face 101 and the second fluid conduit 22.

A link element 104 is fitted in the chamber 100. The link element 104 includes an initiator part 106 and a connector part 108. The connector part is a sliding fit against the cylindrical internal wall of the chamber.

The connector part has a main body 112 which has an outwardly facing groove 114 formed in it. A deformable sealing member 116 is provided in the groove. The main body with the deformable sealing member is a sliding fit against the cylindrical wall of the chamber 100. The connector part has a collar 118 which depends from the main body. The collar has a thread 120 formed on its outer wall. The collar has a shoulder 122 on its inner wall at about the junction between the collar and the main body.

The initiator part of the link element is a tight fit within the collar of the connector part. It has a cylindrical lower part 130 which protrudes from the connector part and an upper part which is provided by a plurality of fingers 132 extending upwardly from the lower part. The fingers can flex radially inwardly and outwardly. Each of the fingers has an outwardly directed barb 134 and an inwardly directed shoulder 138 at its free end.

The initiator part of the link element has four peripheral ledges 136 formed in its outer wall, spaced apart around the periphery of the wall, at about the junction between the upper and lower parts of the initiator part.

Axial movement of the connector part 108 relative to the initiator part 106 is restricted by the peripheral ledges 136 which engage the bottom of the collar 118, and by the outwardly directed barbs 134 on the flexible fingers which engage the shoulder 122 on the collar.

The initiator part of the link element has a pair of outwardly directed lugs 140 at its bottom edge.

The mount includes a support tube 150 for the link element. The support tube 150 if fastened in the central port 102 which extends between the chamber and the first fluid conduit 20, for example by means of an adhesive. The support tube has an outwardly facing flange 152 at its bottom end. The link element is a tight sliding fit on the flange 152 on the support tube so that the interface between the flange and the internal wall of the link element resists loss of a process fluid flowing through the support tube and the link element.

The support tube 150 can be fitted within the fingers 132 of the upper part of the initiator part of the link element. A helical spring 154 is located in the annular space between the fingers and the support tube, which is defined upwardly by the inwardly directed shoulders 138 at the free ends of the fingers and downwardly by the outwardly facing flange 152 at the bottom end of the support tube.

The mount includes a cover plate 156 which fits over the chamber 100. The cover plate has a first opening 158 formed in it through which the initiator and connector parts of the link element can extend. The cover plate has a second opening 160 formed in it which can be aligned with the peripheral port 103 in the mount. The cover plate can be fastened to the mount by means of threaded screws which extend through countersunk holes 162 in the plate into threaded bores in the mount.

Assembling the link component with the mount involves:

a. Positioning the connector part 108 in the chamber 100 with the sealing member 116 compressed within the groove 118 by the cylindrical internal wall of the chamber.
b. Fastening the cover plate 156 over the chamber 100.
c. Fitting the fingers 132 of the initiator part 106 into the collar 118 of the connector part 108. This involves deforming the fingers inwardly until the outwardly directed barbs 134 pass through the collar and can engage the shoulder 122 on the connector part.
d. Positioning the spring 154 on the outer wall of the support tube 150.
e. Inserting the support tube into the bore within the initiator part so that the end of the support tube is received in the central port 102 in the mount.
f. Fastening the support tube in the bore in the mount, for example by means of mating threads or by bonding.

Figure 3:
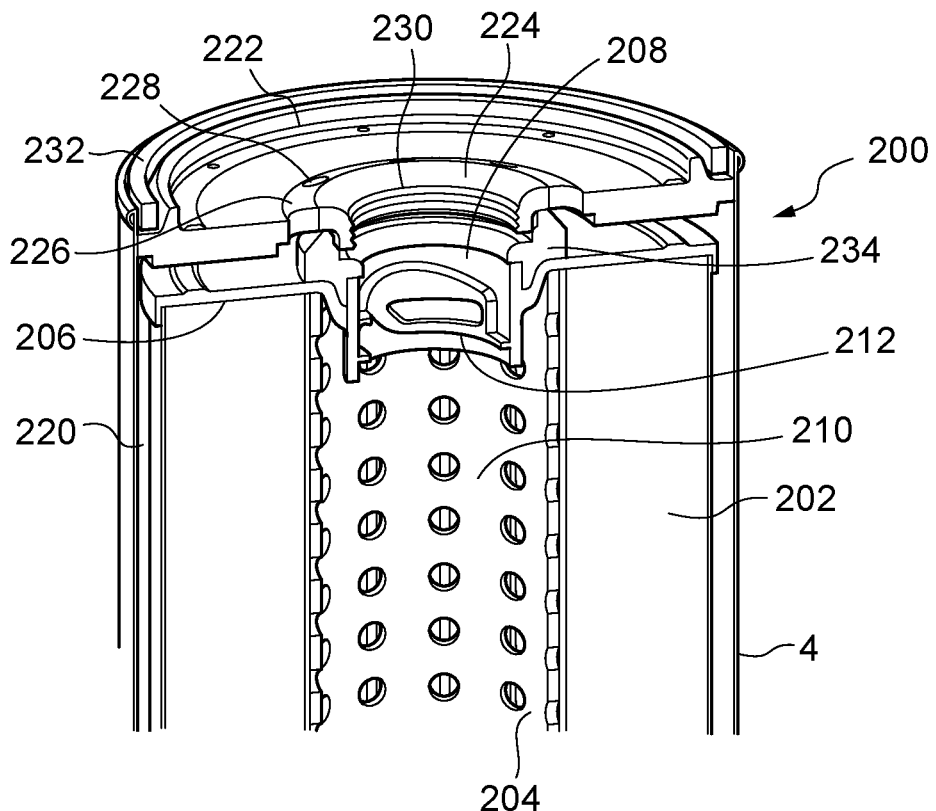
FIG. 3 is an isometric sectional view through a portion of a filter element which can be used in the filter assembly shown in FIG. 1.

FIG. 3 shows a filter element 200 which has a cylindrical wall 202 provided by filter media. The filter media can include a paper filter layer which is formed by pleating. It can include a layer of a coalescer material such as a coalescer foam. The filter element includes a support core 204, for example provided by a perforated cylinder formed from metal sheet. The filter element has top and bottom end fittings. The top end fitting 206 is shown in FIG. 3. It is connected to an end face of the cylindrical wall of the element. Known techniques for fastening an end fitting to a cylindrical wall of a filtration media include use of an adhesive material and welding.

The top end fitting 206 defines a central bore 208 which communicates with a cavity 210 within the element. A pair of helical ramp surfaces 212 are defined on the wall of the bore.

The bottom end fitting (not shown) of the filter element has features which are similar to those of the top end fitting which enable it to be connected to the opposite end face of the cylindrical wall of the element. The bottom end fitting does not have a central bore and so extends continuously across the end face of the filter element.

The filter element is located within the housing body 4 so that an annular space 220 is defined between the cylindrical wall 202 of the filter element and the internal surface of the cylindrical wall 7 of the housing body 4. The housing body is closed at its top end by means of a lid 222. The lid has a central opening 224. A collar 226 surrounds the central opening. Apertures 228 are formed in a radially outward portion of the collar, and a thread 230 is formed in the wall of the central opening 224. The lid is sealed to the cylindrical wall of the housing body at its periphery. A deformable sealing member in the form of an O-ring 232 is provided around the periphery of the lid for forming a seal between the filter element and a mount when the element is connected to the mount (as described below). The lid is sealed to the central bore 208 in the top end fitting 206 of the filter element at the central opening 224 by means of a deformable sealing member in the form of an O-ring 234. The O-ring has an upwardly facing convex sealing surface which engages the underside of the lid. The O-ring has a radially inwardly facing convex surface which protrudes into the central bore 208.

Figure 5:
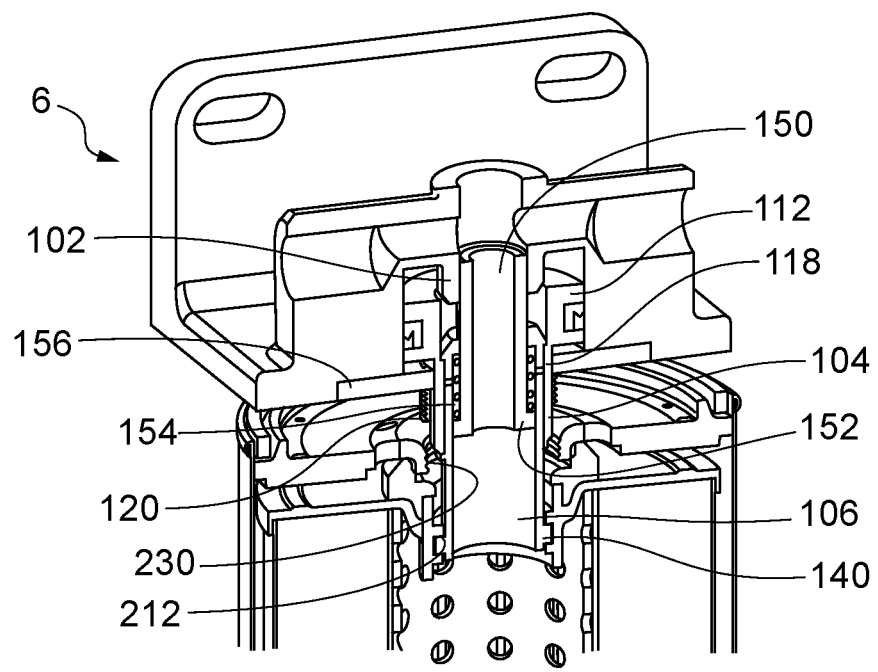
Figure 6:
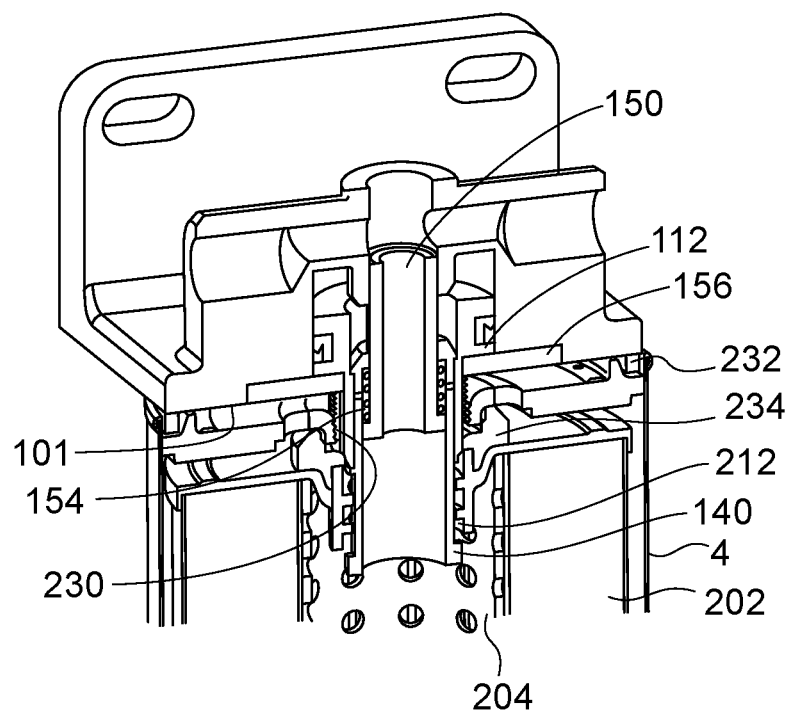

FIGS. 4 to 6 show the mount shown in FIG. 2 and the filter element shown in FIG. 3 at initial, intermediate and fully assembled stages. As shown in FIG. 4, assembly of the filter element 200 (with the housing body 4) with the mount 6 involves aligning the openings in the lid 222 on the housing body and the central bore 208 in the top end fitting 206 of the filter element with the link element 104. Connecting the filter element 200 to the mount 6 involves moving the filter element 200 relative to the mount 6 in a first direction A along an axis 225 of the filter assembly, shown in FIG. 4. The element is advanced towards the mount until the top surfaces of the lugs 140 on the initiator part of the link element are located axially beyond the helical ramp surfaces 212 on the wall of the bore 208 in the top end fitting.

Rotation of the filter element 200 relative to the mount 6 causes the link element 104 to be drawn out of the chamber 100 in the mount by the cam action of the lugs 140 against the helical ramp surfaces 212. The spring 154 is progressively compressed between the inwardly directed shoulders 138 at the free ends of the fingers 132 and the outwardly extending flange 152 at the bottom end of the support tube 150 as the link element is drawn out of the chamber. The rigid connection between the connector part 108 and the initiator part 106 of the link element 104 means that the connector part 108 is also drawn out of the chamber 100, exposing the thread 120 on the collar 118 of the connector part. This can be seen in FIG. 5.

Continued action of the lugs 140 against the helical ramp surfaces 212 caused by rotation of the filter element causes the filter element to be drawn towards the planar bottom face 101 of the mount so that the thread 120 on the collar 118 of the connector part engages the thread 230 which is formed in the central opening 224 in the lid of the element housing. Continued rotation of the filter element 200 relative to the mount causes the O-ring sealing member 232 which is provided around the periphery of the lid of the element housing to be compressed between the lid and the planar bottom face 101 of the mount as the threaded connection between the lid and the mount tightens. The spring 154 is compressed with the main body 112 of the connector part 108 in contact with the cover plate 156 which closes the chamber 100. The lugs 140 become separated from the helical ramp surfaces 212. The assembly is shown in this state in FIG. 6.

The lugs 140 and the ramp surfaces 212 are arranged so that the link element 104 moves from its retracted position to its deployed position in a second direction B along the axis 225, the second direction being opposite to the first direction A of insertion of the filter element 200. In use, the filter element 200 is moved in the first direction A, towards the mount 6, to bring the filter element and the mount together. The cam action between the lugs 140 and the ramp surfaces 212 then causes the link element 104 to be moved in the second direction B, away from the mount 6, to the deployed position.

As can be seen in FIG. 6, the movement of the connector part 108 out of the chamber 100 results in the circumferential surface of the connector part towards its leading edge being received within the radially inwardly facing convex surface of the O-ring seal 234 which protrudes into the central bore 208 in the filter element, forming a fluid tight seal between the filter element and the connector part.

The wall of the central opening 224 in which the female thread 230 is formed has an internal circumference. As can best be appreciated from the sectional view of FIG. 3, the female thread 230 extends substantially continuously around the entire internal circumference, and so in substantially unbroken fashion around the circumference. This can facilitate manufacture of the thread 230. The female thread 230 describes a minimum internal diameter, which is measured from crest to crest of the thread across a diameter of the bore 208. The part of the wall of the tubular bore 208 in which the helical ramp surfaces 212 are formed describes a maximum internal diameter which is less than the minimum internal diameter described by the female thread 230. In this way, the link element 104 defining the lugs 140 can be inserted axially through the female thread 230 without coming into contact with the thread, and so irrespective of a rotational orientation of the link element relative to the filter element 200. The minimum internal diameter described by the female thread 230 is suitably greater than a maximum external diameter described by the lugs 140 on the link element 104, the maximum external diameter being defined by a circle which intersects with maximum radially outer extents 141 (FIG. 2) of the lugs.

The assembly can be used to filter a fluid when a filter element is connected to the mount in the state shown in FIG. 6. The assembly can be used in an outside-to-inside operating mode in which the fluid to be filtered flows through the wall of the filter element from the outside to the inside. The assembly can also be used in an inside-to-outside operating mode in which the fluid to be filtered flows through the wall of the filter element from the inside to the outside. Operation of the assembly is described below with the fluid flowing through the element wall from the outside to the inside.

A fluid which is to be filtered is supplied to the assembly through one of the ports 26 of the second process fluid conduit 22. The unused ports of the second process fluid conduit are blocked using appropriate blanking pieces. The fluid flows through the peripheral port 103 into the space between the housing lid 222 and the cover plate 156 and bottom face 101 of the mount. It then flows into the space between the top end fitting 206 of the filter element and the lid 222 of the housing through the apertures 228 which are formed in the outward portion of the collar 226. The O-ring seal 234 located between the central bore in the top end fitting 206 and the central opening 224 in the lid isolates the fluid flowing into that space from fluid within the cavity 210 in the element which has been filtered.

The fluid flows to the annular space 220 which is defined between the cylindrical wall 202 of the filter element and the internal surface of the cylindrical wall 7 of the housing body 4, and then through the wall of the filter element. Contaminants in the fluid (for example particulate contaminants and droplets of an immiscible liquid when the fluid is a liquid) are retained within the wall of the filter element. The filtered fluid is then discharged from the wall of the filter element into the central cavity 210 within the element.

Filtered fluid flows the connector part 108 and the central port 102 in the mount and is discharged from the assembly through one of the ports 24 of the first process fluid conduit 20.

The fluid flows through the wall of the filter element into the annular space 220 which is defined between the cylindrical wall 202 of the filter element and the internal surface of the cylindrical wall 7 of the housing body 4. Contaminants in the fluid are separated from the fluid by the layers of filter media which make up the wall of the filter element. Any liquid contaminants which are separated in this way can be discharged from the filter assembly through the drain in the housing base. The use of drains in filter assemblies of this general kind is known.

The fluid which has been filtered by passing through the wall of the filter element flows to the space between the top end fitting 206 of the filter element and the lid 222 of the housing. The O-ring seal 234 located between the central bore in the top end fitting 206 and the central opening 224 in the lid isolates the fluid flowing into the cavity within the filter element from the fluid which has been filtered.

The fluid in the space between the top end fitting 206 of the filter element and the lid 222 of the housing flows out of the space through the apertures 228 which are formed in the outward portion of the collar 226, into the space between the housing lid 222 and the cover plate 156 and the bottom face 101 of the mount. Fluid is discharged from this space through the peripheral port 103 to the second fluid conduit 22.

The flow of the fluid is reversed compared with that described above when the assembly operates in outside-to-inside mode.

Figure 7:
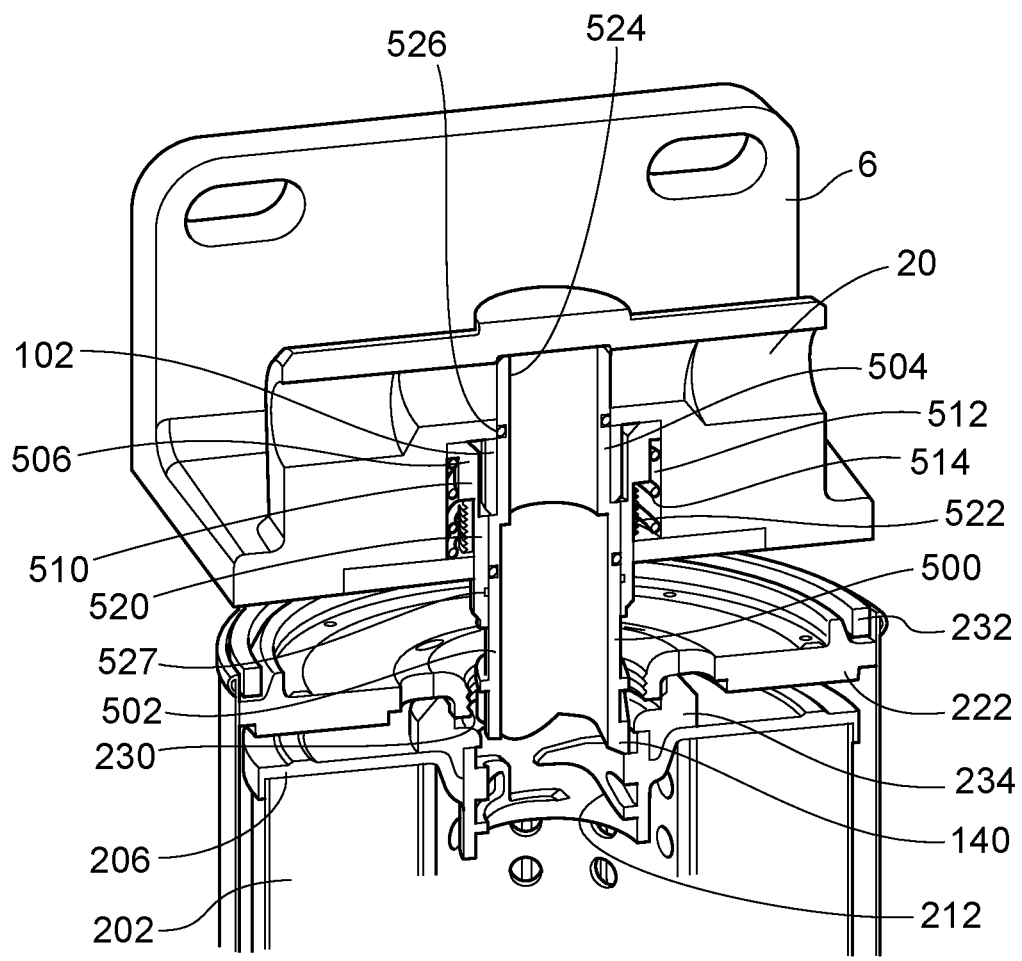
FIGS. 7 to 9 are isometric sectional views of the filter element shown in FIG. 3 with another mount, at initial, intermediate and fully assembled stages.
Figure 8:
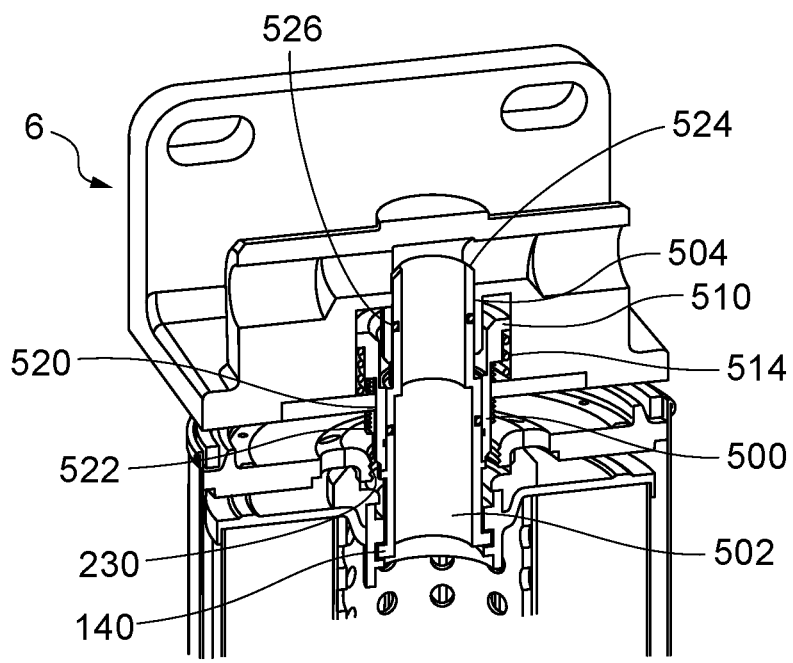
Figure 9:
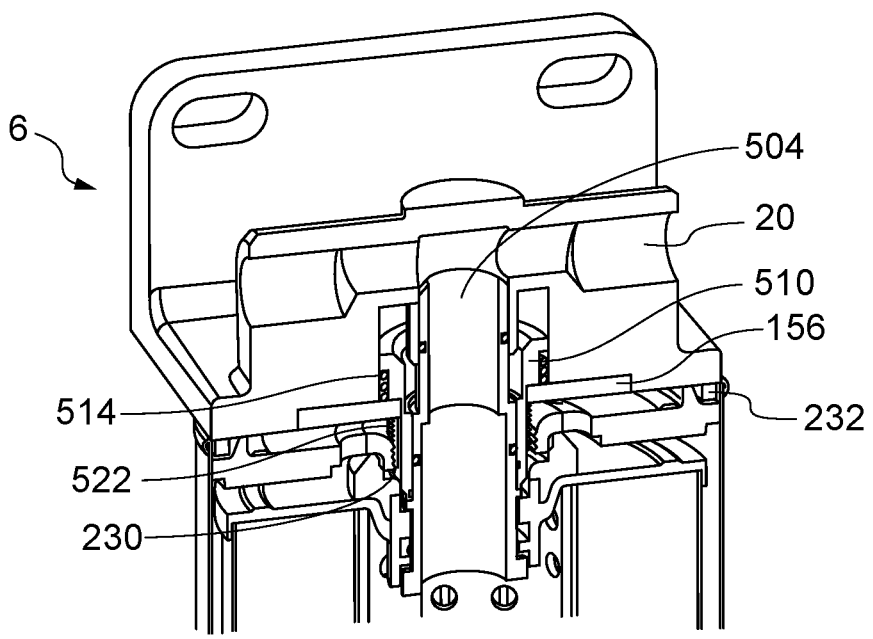

FIGS. 7 to 9 show a different mount and a filter element as shown in FIG. 3 at initial, intermediate and fully assembled stages. In this mount, the link element 500 has initiator part 502, a valve member part 504 and a connector part 506. Many of the features of the assembly are common to the assemblies shown in FIGS. 4 to 6 and in FIGS. 7 to 9. The same reference numerals are used for these features.

The connector part 506 of the link element 500 has a main body 510 which is a sliding fit against the cylindrical wall of the chamber 100. The main body has an annular cut out 512 in its outer wall which defines a pocket in which a spring 514 can be received, acting between the cover plate on the cavity 100 and the main body of the connector part. The connector part has a collar 520 which depends from the main body 510.

In the embodiment shown in FIGS. 7 to 9, the initiator and valve member parts 502, 504 of the link element 500 are formed integrally as a single piece, for example by moulding or casting. The diameter of the initiator part is smaller than that of the valve member part. The initiator part is a sliding fit within the collar 520 of the connector part. As with the embodiments shown in FIGS. 4 to 6, a thread 522 is formed on the collar.

The valve member part 504 is a sliding fit in the central port 102 in the mount. The free upper end 524 of the valve member part is shaped to form a seal with an appropriately shaped surface which defines the first conduit 20 for the process fluid when the valve member part is urged into contact with that surface of the first conduit. An O-ring seal 526 is provided in a groove in the outer wall of the valve member part, which provides a seal between the valve member part and the wall of the central port 102 in the mount.

Axial movement of the connector part 506 of the link element relative to the initiator and valve member parts 502, 504 is restricted by means of a tongue 527 on the outer surface of the initiator part which is received in a groove in the inner surface of the collar 520 of the connector part. The initiator part 502 and the connector part 506 therefore move as a single component relative to the mount when they are assembled together. It is an advantage in some situations that they are provided as separate parts because this enables them to be made from different materials. For example, the initiator part can be made from a polymeric material which has the advantages that it allows convenient manufacture by moulding and that a relatively soft material can be used. The connector part can be made form a metal, for example by casting or machining or a combination of the two. The use of a metal has the advantage that a relatively hard material can be used which is not prone to damage, for example because of wear.

A fluid which is to be filtered is supplied to the assembly through one of the ports 24 of the first process fluid conduit 20. The unused ports of the first process fluid conduit are blocked using appropriate blanking pieces. When the mount does not have a filter element connected to it, the upper end 524 of the valve member abuts the matching surface which defines the first conduit 20, forming a seal to that surface. This prevents flow of the process fluid from the first conduit through the central port 102. The mount is shown in this state in FIG. 7, together with a filter element which is the same as the one shown in FIGS. 4 to 6.

As shown in FIG. 7, assembly of the filter element 200 (with the housing body 4) with the mount 6 involves aligning the openings in the lid 222 on the housing body and the central bore 208 in the top end fitting 206 of the filter element with the link element 500. The element is advanced towards the mount until the top surfaces of the lugs 140 on the initiator part of the link element are located axially beyond the helical ramp surfaces 212 on the wall of the bore 208 in the top end fitting.

Rotation of the filter element 200 relative to the mount 6 causes the link element 500 to be drawn out of the chamber 100 in the mount by the cam action of the lugs 140 against the helical ramp surfaces 212, compressing the spring 514. The rigid connection between the connector part 506 and the initiator part 502 of the link element 500 means that the connector part 506 is also drawn out of the chamber 100, exposing the thread 522 on the collar 520 of the connector part. The formation of the initiator part 502 and the valve member part 504 of the link element 500 as one part means that the upper end 524 of the valve member becomes separated from the matching surface which defines the first conduit 20, opening the link element to flow of fluid from the first conduit 20 to the chamber 100. This can be seen in FIG. 8.

Continued action of the lugs 140 against the helical ramp surfaces 212 caused by rotation of the filter element causes the filter element to be drawn towards the planar bottom face 101 of the mount so that the thread 522 on the collar 520 of the connector part engages the thread 230 which is formed in the central opening 224 in the lid of the element housing. Continued rotation of the filter element 200 relative to the mount causes the O-ring sealing member 232 which is provided around the periphery of the lid of the element housing to be compressed between the lid and the planar bottom face 101 of the mount as the threaded connection between the lid and the mount tightens. The spring 514 is compressed with the main body 112 of the connector part 506 in contact with the cover plate 156 which closes the chamber 100. The assembly is shown in this state in FIG. 9.

Use of the filter assembly which is shown in FIGS. 7 to 9 is the same as for the assembly shown in FIGS. 4 to 6. The assembly which is shown in FIGS. 7 to 9 has the added advantage that the engagement of the valve member with the matching surface which defines the first conduit can help to reduce loss of the process fluid from the first fluid conduit when a filter element is not attached to the mount.

The invention claimed is:

1. A filter assembly which comprises a mount having at least one port, and a filter element, each of the filter element and the mount having inter-engaging connection formations by which the filter element and the mount can be detachably connected to one another, and the mount defining a flow path for fluid to flow between the port and the filter element when the filter element is connected to the mount, the filter element comprising a filtration media and an end fitting at one end of the filter element through which a sealing connection is made between the filter element and mount, in which the filtration media defines a hollow chamber, and the end fitting has a tubular bore extending from the end fitting in a direction towards the hollow chamber which defines an axis and is open for fluid flow at the end fitting so that fluid can flow between the mount and the hollow chamber, in which the mount includes a link element which can slide relative to the mount between a retracted position and a deployed position, the link element having one of a lug and an inclined ramp surface which is arranged around the axis, and a wall of the tubular bore of the filter element having the other of the lug and the inclined ramp surface, and in which the lug and the inclined ramp surface form a cam drive in which the lug is capable of engaging the inclined ramp surface as the filter element and the mount are brought together for assembly, and of sliding along the inclined ramp surface when the filter element is rotated relative to the mount to cause the link element to be drawn out of the mount towards its deployed position, and in which the connection formations on the mount are provided on the link element, and the mount and the filter element are configured so that the connection formations on the mount and the filter element are unable to engage one another when the link element is in its retracted position.

2. The filter assembly as claimed in claim 1, in which at least part of the inclined ramp surface extends approximately helically around the one of the filter element and the link element which has the inclined ramp surface.

3. The filter assembly as claimed in claim 1, in which the link element is configured to move axially away from the mount to the deployed position.

4. The filter assembly as claimed in claim 3, in which the link element is moved by rotating the filter element relative to the mount while the lug is engaged with the ramp surface, a shape of the inclined ramp surface causing the lug to be drawn out of the mount.

5. The filter assembly as claimed in claim 1, in which the mount includes an end stop which limits movement of the link element relative to the mount and defines a fully deployed position of the link element.

6. The filter assembly as claimed in claim 1, in which the link element includes a tubular member having a side wall and the lug or the inclined ramp surface is provided on the side wall of the tubular member.

7. The filter assembly as claimed in claim 1, in which the link element comprises a first part on which the lug or the inclined ramp surface is provided, and a second part on which the connection formations are provided, and in which the first and second parts are arranged in fixed relation to each other so they can slide as a single component within the mount.

8. The filter assembly as claimed in claim 1, in which the connection formations comprise a male thread on one of the filter element and the mount, and a corresponding female thread on the other of the filter element and the mount.

9. The filter assembly as claimed in claim 1, in which the mount includes a valve having an open state in which fluid can flow along the flow path and a closed state in which the valve at least partially prevents flow of fluid along the flow path.

10. The filter assembly as claimed in claim 9, in which the link element forms part of the valve.

11. The filter assembly as claimed in claim 10, in which the link element defines part of the flow path when it is in its deployed position and forms and at least partial obstruction to flow of fluid along the flow path when it is in its retracted position.

12. The filter assembly as claimed in claim 10, in which the valve includes a valve member which slides in a bore in the mount through which fluid can flow towards the filter element for filtration or away from the filter element after being filtered.

13. The filter assembly as claimed in claim 12, in which the valve member is acted on by the link element to move the valve between the open and closed states of the valve.

14. The filter assembly as claimed in claim 12, in which the valve member can slide between a retracted position in which the bore in the mount in which the valve member can slide is occluded and a deployed position in which the bore is at least partially open for flow of fluid.

15. The filter assembly as claimed in claim 12, in which the bore in the mount has an opening in its side wall which is at least partially open to flow of fluid when the valve member is in its deployed position, and in which movement of the valve member to its retracted position causes the opening to be closed at least partially by the valve member.

16. The filter assembly as claimed in claim 15, in which the valve member is tubular and has an open end shaped to form a seal with a corresponding surface of the mount when the valve member is in its retracted position.

17. The filter assembly as claimed in claim 1, in which the filter element and the mount have cooperating sealing surfaces, and the sealing surface on the mount is provided on the link element.

18. The filter assembly as claimed in claim 17, in which at least one of the cooperating sealing surfaces is provided by a deformable sealing member.

19. The filter assembly as claimed in claim 17, in which the mount includes a sealing member for forming a seal between the mount and the link element.

20. The filter assembly as claimed in claim 17, in which the link element comprises a first part on which the lug or the inclined ramp surface is provided and a second part, the first and second parts being arranged in fixed relation to each other so that they can slide as a single component within the mount, and in which the sealing surface on the link element is provided in the second part of the link element.

21. The filter assembly as claimed in claim 1, in which the mount includes a spring which acts on the link element to bias the link element towards its retracted position.

22. The filter assembly as claimed in claim 1, in which the filter assembly further includes a housing with a lid, and the filter element is located within the housing, and where the connection formations on the filter element are provided in a central opening of the lid, in which the central opening has an internal circumference, and in which the connection formations extend continuously around the entire internal circumference of the central opening.

23. The filter assembly as claimed in claim 1, in which the connection formations on the filter element define a female thread describing a minimum internal diameter measured from crest to crest of the thread, and in which a part of the wall of the tubular bore in which the other of the lug and the inclined ramp surface is formed describes a maximum internal diameter which is less than the minimum internal diameter described by the female thread.

24. The filter assembly as claimed in claim 1, in which the inclined ramp surface is formed in the wall of the tubular bore.

25. The filter assembly as claimed in claim 24, in which the connection formations on the filter element define a female thread describing a minimum internal diameter which is greater than a maximum external diameter described by the lug of the cam drive, which is provided on the mount.

26. The filter assembly as claimed in claim 1, which includes a sealing member which protrudes from a surface of the end fitting which defines the tubular bore in the end fitting and extends continuously around the tubular bore, the material of the sealing member being more deformable than the material which defines the tubular bore.

* * * * *